United States Patent [19]
Tsuda et al.

[11] Patent Number: 5,206,887
[45] Date of Patent: Apr. 27, 1993

[54] UNIQUE WORD DETECTION APPARATUS

[75] Inventors: Hiroki Tsuda; Hizuru Nawata, both of Tokyo, Japan

[73] Assignee: NEC Corporation, Tokyo, Japan

[21] Appl. No.: 591,573

[22] Filed: Sep. 26, 1990

[30] Foreign Application Priority Data

Sep. 26, 1989 [JP] Japan .................. 1-247915

[51] Int. Cl.$^5$ .............................................. H04L 7/00
[52] U.S. Cl. ................................. 375/114; 375/116; 370/105.4
[58] Field of Search .................. 375/76, 97, 114, 116; 370/105.1, 104.1; 364/715.11

[56] References Cited

U.S. PATENT DOCUMENTS

| | | | |
|---|---|---|---|
| 4,686,672 | 8/1987 | Namiki | 370/104.1 |
| 5,012,491 | 4/1991 | Iwasaki | 375/114 |

Primary Examiner—Curtis Kuntz
Assistant Examiner—T. Ghebretinsae
Attorney, Agent, or Firm—Sughrue, Mion, Zinn, Macpeak & Seas

[57] ABSTRACT

A unique word detection apparatus for detecting a unique word out of a demodulated signal resulting from the demodulation of a burst signal consisting of a carrier recovery section, a bit timing recovery section, a unique word section and a data section. The magnitude of the D.C. component of the demodulated signal is extracted, and the timing of the transition of this D.C. component from large to small is detected. An aperture signal designating the period in which to detect the unique word on the basis of the transition timing of the D.C. component generated, and the unique word out of the demodulated signal entered during the period designated by the aperture signal is accurately detected.

4 Claims, 3 Drawing Sheets

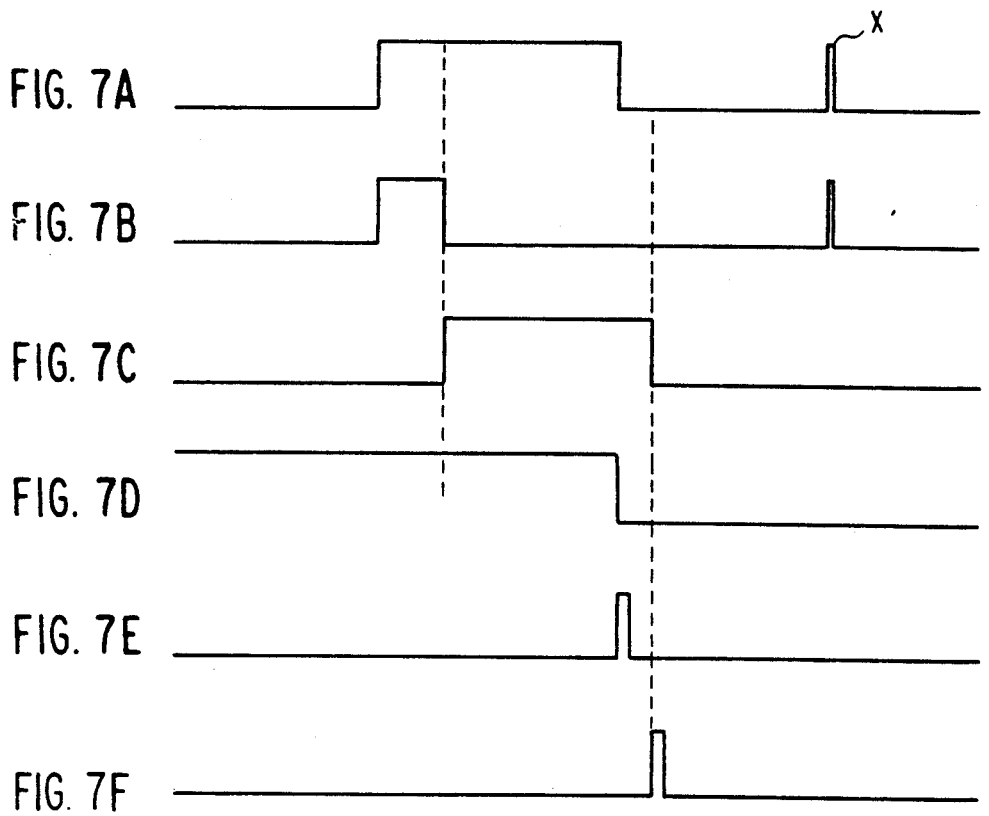
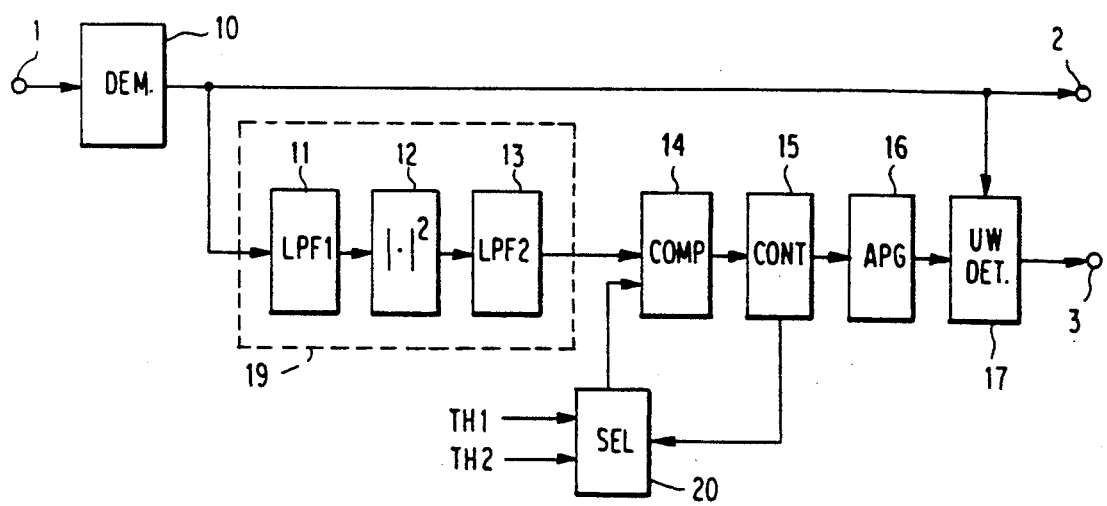

UNIQUE WORD DETECTION APPARATUS

BACKGROUND OF THE INVENTION

The present invention relates to a unique word detection apparatus, and more particularly to an apparatus for detecting a unique word for use in a satellite communication system using a burst transmission.

In satellite communication, an earth station adds a preamble at the top of the data. The preamble comprises a carrier recovery section for recovering the carrier on the receiving side, a bit timing recovery section for recovering the clock on the receiving side, and a unique word which is distinguishable from other data. The preamble and the data modulate a carrier, and the modulated carrier is R/F converted and transmitted to the satellite as a burst.

Another earth station having received this burst via the satellite detects the unique word from the received burst, and extracts the data in the burst. Therefore, if this unique word fails to be detected or a bit pattern similar to the bit pattern of the unique word is mistaken for that of the unique word, the receiving earth station will be unable to correctly receive the transmitted data.

According to the prior art, the following method is used to detect a unique word out of a received burst. As the received burst, after being converted into an intermediate frequency band, is entered into a demodulator, a non-zero D.C. component will appear in a demodulated signal corresponding to the carrier recovery section of the received burst. The D.C. components of the demodulated signal corresponding to the bit timing recovery section, unique word and data section are virtually zero. According to the prior art, the rise timing of the D.C. component contained in the demodulated signal of the carrier recovery section, i.e. the start timing of the carrier recovery section, is detected. Since the timing of the unique word supply is predetermined in the burst in reference to the start timing of the carrier recovery section, the receiving side forms an aperture signal, on the basis of the detected start timing, to indicate the period during which the unique word is to be detected. A unique word detector detects the unique word from the demodulated signal only during the period designated by this aperture signal.

To prevent the aforementioned misdetection of the unique word, the unique word is detected only during the period designated by the aperture signal according to this prior art.

However, since the carrier phase acquisition is not fully established in the demodulator while the leading part of the carrier recovery section is being entered into the demodulator, the D.C. component in the demodulator's output does not take on a sufficiently large value. Therefore, even if it is attempted to detect the start timing of the carrier recovery section by using a suitable threshold, accurate detection of this start timing is impossible. According to the prior art, the failure to detect the unique word is prevented by providing a sufficient width for the aperture signal. This makes it impossible to fully prevent the aforementioned misdetection of the unique word, and thereby invites a deterioration of the reliability of the satellite communication network and an increase in the traffic volume due to retransmitted data.

SUMMARY OF THE INVENTION

It is therefore an object of the present invention to provide a unique code detection apparatus capable of maintaining a low probability that the aforementioned misdetection of the unique word will occur.

According to the invention, there is provided a unique word detection apparatus for detecting a unique word out of a demodulated signal resulting from the demodulation, by a demodulator, of a burst signal consisting of a carrier recovery section, a bit timing recovery section, a unique word section and a data section, comprising:

D.C. component extracting means for extracting the D.C. component of said demodulated signal;

carrier recovery section end detecting means for detecting the end timing of said carrier recovery section from the output of said D.C. component extracting means;

means for forming an aperture signal with which to estimate the position of the unique word contained in said demodulated signal on the basis of said end timing; and means for detecting the unique word out of said demodulated signal on the basis of said aperture signal.

According to the invention, the trailing part of the output of the D.C. component extracting means, i.e. the end timing of the carrier recovery section in the burst, is detected. Since carrier phase acquisition is established in the demodulator toward the end of the carrier recovery section, the D.C. component of the demodulator output has a sufficiently large value there. As the demodulation of the carrier recovery section is completed and that of the bit timing recovery section is started, the output level of the D.C. component extracting means quickly falls. The timing of this output fall of the D.C. component extracting means can be stably extracted even if the C/N ratio of the received burst has dropped. Since the aperture signal is formed on the basis of this output fall timing according to the present invention, the timing of the unique word input can be accurately estimated. The invention thus makes it possible to prevent misdetection of the unique word by narrowing the aperture width.

BRIEF DESCRIPTION OF THE DRAWINGS

FIG. 3A illustrates the demodulator output in the absence of signal; FIG. 3B, the demodulator output in the carrier recovery section; and FIG. 3C, the demodulator output in the bit timing recovery section, the unique word and data sections.

FIG. 7 is a timing chart for describing the operation of the control circuit; and FIG. 8 is a block diagram illustrating a unique word detecting circuit, which is a second preferred embodiment of the invention.

DESCRIPTION OF THE PREFERRED EMBODIMENTS

Figure 1:
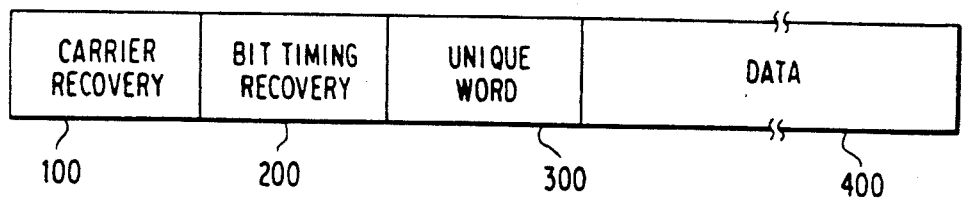
FIG. 1 illustrates the composition of a burst.

Before describing the present invention, a unique word detection apparatus according to the prior art will be described. FIG. 1 illustrates a usual burst frame configuration, and FIG. 2, the configuration of a unique word detecting circuit according to the prior art.

In FIG. 1, a burst comprises a carrier recovery section 100 further consisting of an unmodulated carrier, a bit timing recovery section 200 consisting of the carrier modulated with a clock pulse, a unique word section consisting of the carrier modulated with a unique word, and a data section 400 consisting of the carrier modulated with a data signal.

Figure 2:
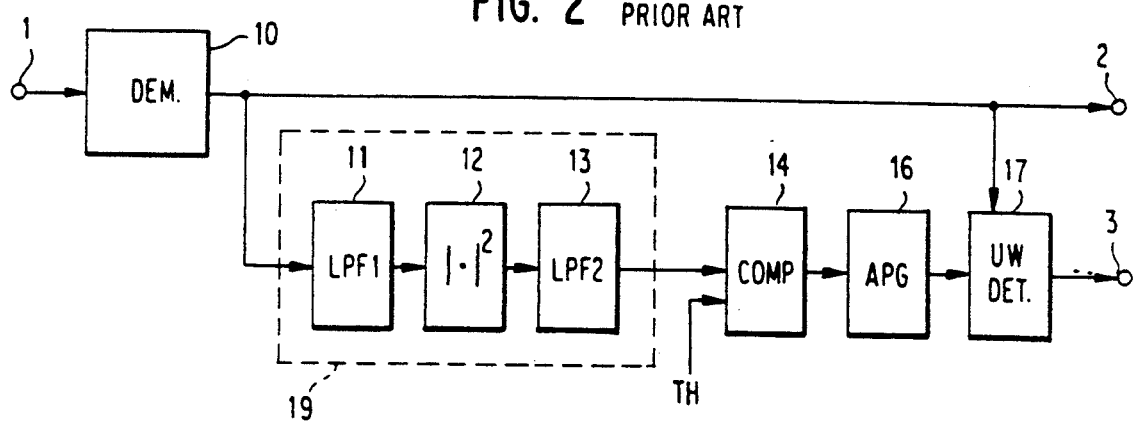
FIG. 2 is a block diagram illustrating the configuration of a unique word detecting circuit according to the prior art.

In FIG. 2, a PSK modulated signal supplied from an input terminal 1 is demodulated by a demodulating circuit 10. The demodulated signal is supplied as received data from an output terminal 2. Out of the demodulated signal is detected the carrier recovery section at the top of the burst by a first low-pass filter 11, a squaring circuit 12, a second low-pass filter 13 and a comparator circuit 14. The detection timing of the unique word following the bit timing recovery section is estimated from the burst frame composition predetermined by an aperture generating circuit 16 in reference to this detection timing (carrier recovery section start detection signal), and an aperture is provided accordingly. The aperture generating circuit 16 may be composed, for instance, of a delay circuit for delaying the carrier recovery section start detection signal and a one-shot monostable multivibrator triggered by the leading edge of the output of this delay circuit. A unique word detector 17 detects the unique word out of the demodulated signal within the aperture formed by the aperture generating circuit 16, and supplies a unique word detection signal from an output terminal 3. For the configuration of the unique word detector, reference may be made to W.W. Wu, "Elements of Digital Satellite Communication" Vol. 1 (COMPUTER SCIENCE PRESS, 1984), p.p. 342-348.

Figure 3A:
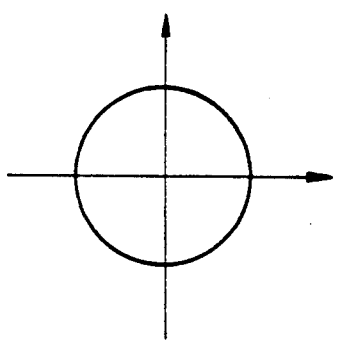
FIGS. 3A to 3C are diagrams in which the output of the demodulator 10 in FIG. 2 are represented on a phase plane, and in further detail.
Figure 3B:
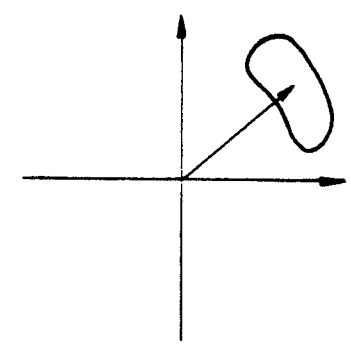
Figure 3C:
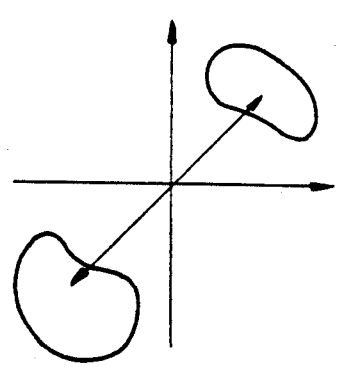

The foregoing operation will be described more specifically. The first low-pass filter 11, the squaring circuit 12, and the second low-pass filter 13 constitute D.C. component extracting means 19. The output of the demodulating circuit 10 is supplied to the first low-pass filter 11. The demodulating circuit 10, upon establishment of carrier synchronism therein, supplies a D.C. vector when the carrier recovery section of FIG. 1 is entered. The magnitude of this D.C. vector is determined with the squaring circuit (or absolute value circuit) 12. In order to restrain the increase of signal dispersion by the squaring circuit 12, its output is supplied to the second low-pass filter circuit 13. The level of the second low-pass filter circuit 13 is compared by the comparator circuit 14 with a pre-determined threshold to detect the start timing of the carrier recovery section. FIGS. 3A, 3B and 3C show, on a phase plane, the outputs of the demodulating circuit 10 respectively in the absence of a signal, at the time of receiving the unmodulated carrier (carrier recovery section) and at the time of receiving the modulated carrier (bit timing recovery section, unique word section or data section).

As shown in FIG. 3A, the output of the demodulating circuit 10 in the absence of a signal is dispersed around the origin of the phase plane. Even if this is passed through the first low-pass filter 11, no D.C. component is detected, but it is dispersed around the center. In the dispersion after passing the first low-pass filter 11, noise is compressed and reduced. The magnitudes of the output are dispersed around very small values close to zero and, after they are detected by the squaring circuit 12 and become even closer to zero after passing through the second low-pass filter 13.

Where the input is the unmodulated carrier (carrier recovery section the modulated signals will be dispersed in a substantially oval shape as shown in FIG. 3B. This dispersion is due to variations in the output of a phase lock loop in the demodulating circuit 10. As these signals are passed through the first low-pass filter 11, the oval-shaped dispersion is reduced. If the magnitude of this vector is obtained by the squaring circuit 12, there will be observed a non-zero stable D.C. value unlike those in the absence of a signal. From the output of the second low-pass filter 13 is obtained a value above a certain level, i.e. the carrier recovery section can be distinguished.

Where the input is the modulated carrier, the modulated signals will be dispersed by the PLL in oval forms symmetric around the center on a phase plane, as shown in FIG. 3C, and there are supplied vectors having phases in mutually inverse directions corresponding to "0" and "1" signals. These vector outputs cancel each other in the first low-pass filter 11, leaving only the noise component. As a result, the output will resemble that in the absence of signal, and be close to zero in value with respect to the modulated wave. Thus, when the carrier recovery section (unmodulated carrier) is received at the top of the burst, a stable high level signal is supplied from the second low-pass filter 13.

The comparator circuit 14 compares the output of the second low-pass filter 13 with a predetermined threshold (TH), and generates the start timing of the carrier recovery section, i.e., a carrier recovery section start detection signal.

By the unique word detection method according to the prior art, the start timing of the carrier recovery section at the top of the burst is detected, and an aperture signal is generated by estimating the timing at which the unique word is to be detected from the predetermined time relationship between the carrier recovery section and the unique word section, as shown in FIG. 1, with reference to that start timing.

Figure 4:
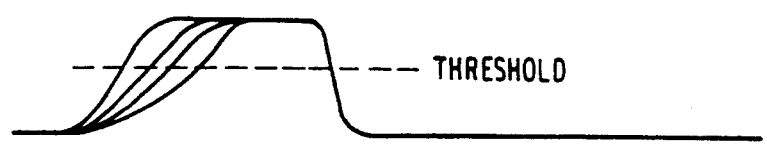
FIG. 4 illustrates the output waveform of the D.C. component extracting means 19 in FIG. 2.

Now, the D.C. value extracted from the output of the demodulating circuit 10 by the D.C. component extracting means 19, as shown in FIG. 4, is slow to rise and fluctuates in rise time. This is because, at the time that the leading part of the carrier recovery section is entered into the demodulating circuit 10, the phase synchronism of the carrier is not yet fully established in the demodulating circuit 10. The time needed to establish this synchronism also varies with the carrier power to noise power (C/N) ratio of the input burst. Therefore, according to the technique illustrated in FIG. 2, the timing at which the output of the D.C. component extracting means 19 superpasses the threshold becomes so fluctuated that the aperture signal should be made wide enough to accommodate its fluctuations. As a result, it is difficult to prevent misdetection of the unique word.

Now will be described a first preferred embodiment of the present invention with reference to FIG. 5. The first embodiment consists of a demodulator 10 for demodulating a received burst signal; a D.C. component extracting means 19; a comparator circuit 14 for supplying a carrier recovery section start detection signal which indicates that the output of the D.C. component extracting means has surpassed a threshold; a control circuit 15 for supplying, on the basis of the carrier recovery section start detection signal, a carrier recovery section completion detection signal indicating the end time of the carrier recovery section of the received burst; an aperture generating circuit 16 for supplying, on the basis of the carrier recovery section completion detection signal, an aperture signal for detecting a unique word; and a unique word detector 17 for detecting the unique word from the output of the demodulator 10 on the basis of the aperture signal.

Figure 5:
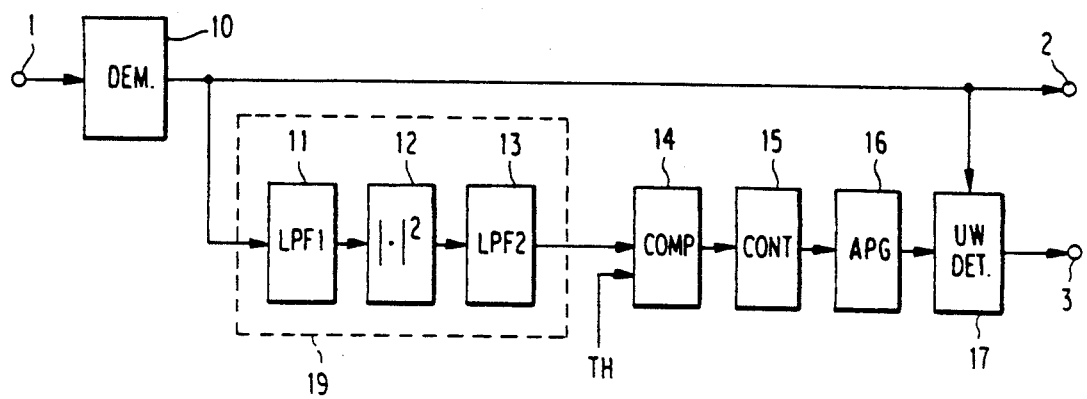
FIG. 5 is a block diagram illustrating a unique word detecting circuit, which is a first preferred embodiment of the invention.

In FIG. 5, the configurations and operations of the demodulator 10, the D.C. component extracting means 19 and the comparator circuit 14 are the same as those of the corresponding units in the prior art described with reference to FIG. 2, and accordingly their description will not be repeated here. The carrier recovery section start detection signal outputted by the comparator circuit 14 is supplied to the control circuit 15. This carrier recovery section detection signal reaches a high level when the output of the D.C. component extracting means 19 is beyond the threshold. The control circuit 15 judges that the carrier recovery section has been detected when the carrier recovery section detection signal has remained at the high level for at least a certain duration. The control circuit 15 further detects the timing of transition to the bit timing generation section at which the carrier recovery section of the received burst has ended, and supplies the aperture generating circuit 16 with the carrier recovery section completion detection signal indicating the timing of that detection. The configuration of the control circuit 15 will be described later. The aperture generating circuit 16 supplies, on the basis of the carrier recovery section completion detection signal, the unique word detecting circuit 17 with an aperture signal for estimating the timing and duration of the arrival of the unique word. The unique word detecting circuit 17 detects the unique word from the output of the demodulator 10 during the period designated by the aperture signal, and supplies the unique word detection signal to a terminal 3.

Figure 6:
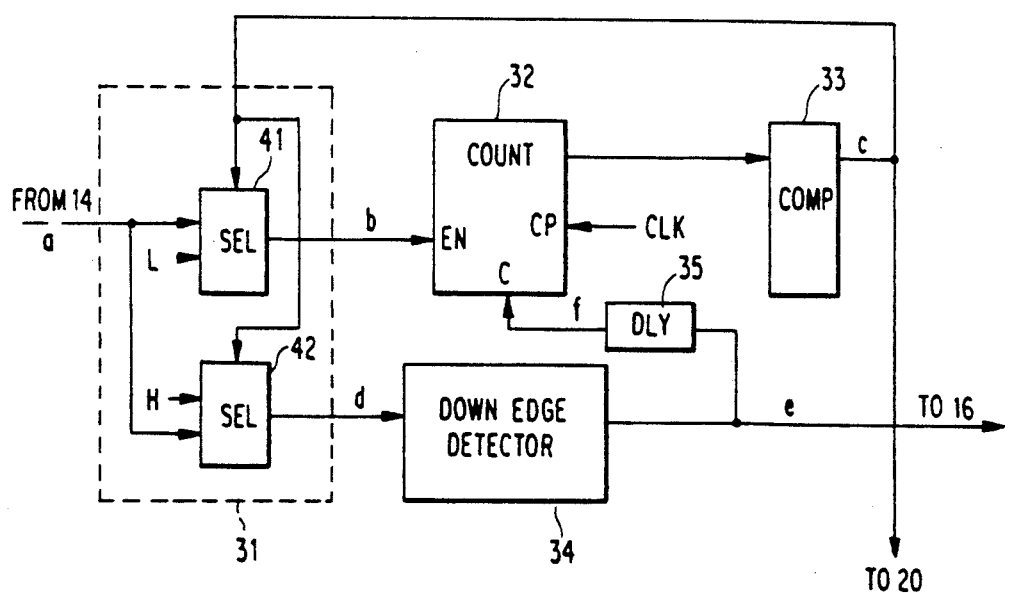
FIG. 6 is a block diagram illustrating the configuration of a control circuit for use in the preferred embodiment of the invention.

Next, with reference to FIGS. 6 and 7, will be described the configuration and operation of the control circuit 15. FIG. 6 is a block diagram illustrating the configuration of the control circuit 15, and FIG. 7, a timing chart for describing its operation.

In FIG. 6, the control circuit 15 has a switching circuit 31 for providing, on the basis of a switching control signal supplied from a comparator circuit 33, either the enable terminal of a counter 32 or a down edge detecting circuit 34 with the carrier recovery section detection signal supplied from the comparator circuit 14 of FIG. 5. The control circuit 15 is also equipped with a counter 32 for increasing the count according to a clock supplied from a clock generator (not shown) when a high level signal is provided from the switching circuit 31, and a comparator circuit 33 for providing the switching circuit 31 with the aforementioned switching control signal when the count of the counter 32 has reached a prescribed value. The control circuit 15 is further provided with the down edge detector 34 for detecting the down edge of the output of the switching circuit 31 and supplying the aforementioned carrier recovery section completion detection signal, and a delay circuit 35 for delaying this carrier recovery section completion detection signal and supplying the delayed signal to the clear terminal of the counter 32.

Whereas the switching control signal is supplied not only to the switching circuit 31 but also outside the control circuit 15 in FIG. 5, the switching control signal supplied outside the control circuit 15 is used in a second preferred embodiment of the present invention to be described later.

The switching circuit 31 is composed of two selectors 41 and 42. The selector 41 outputs the carrier recovery section detection signal supplied from the comparator circuit 14 of FIG. 5 when the switching control signal supplied from the comparator circuit 33 is at a low level or outputs a low level signal when the switching control signal is at a high level. The selector 42 outputs the carrier recovery section detection signal when the switching control signal is at a high level or outputs a high level signal when not.

Now will be described the operation of the control circuit 15 with reference to FIG. 7 as well. Into the switching circuit 31 is entered the carrier recovery section detection signal shown in FIG. 7(a). At the rise timing of the carrier recovery section detection signal, the switching control signal shown in FIG. 7(c) is at its low level, so that the input to the switching circuit 31 is entered into the enable terminal of the counter 32 (FIG. 7(b)). The counter 32, when the input of the enable terminal is high level, counts clock pulses supplied from the clock generator (not shown), and supplies the count to the comparator circuit 33. The output of the comparator circuit 33 rises to a high level if the count is beyond a predetermined value. The output of this comparator circuit 33 is the aforementioned switch control signal. When this signal rises to its high level as shown in FIG. 7(c), the switching circuit 31 supplies the carrier recovery section detection signal to the down edge detector 34 (FIG. 7(d)). When this switching takes place, the signal supplied from the switching circuit 31 to the enable terminal of the counter 32 falls to its low level (FIG. 7(b)). The down edge detector 34 extracts the down edge of the supplied signal to obtain the carrier recovery section completion detection signal (FIG. 7(e)). The carrier recovery section completion detection signal is given a delay, which is slightly greater than the duration of its high level, by the delay circuit 35, and is entered into the counter 32 as a reset signal (FIG. 7(f)). The counter 32, when supplied with the reset signal, is reset. When the counter 32 is reset, the output of the comparator circuit 33, i.e. the switching control signal, falls to its low level as shown in FIG. 7(c). When the switching control signal falls to its low level, the switching circuit 31 again enters the carrier recovery section detection signal into the enable terminal of the counter 32, and stands by to detect the unique word in the burst coming next.

Although the delayed carrier recovery section completion detection signal is used as the reset signal for the counter 32 in the control circuit 15 structured as illustrated in FIG. 6, this reset signal need not be generated within the control circuit 15. For instance, if a received signal processing circuit to be arranged subsequent to the unique word detection apparatus according to the present invention generates a signal indicating the end of a burst, this signal may as well be used as the reset signal for the counter 32. Or if the unique word detector 17 of FIG. 5 has a function to generate a unique word non-detection signal as well, the counter 32 may be reset by using both the unique word detection signal and the unique word non-detection signal.

The control circuit 15 of the above described configuration prepares for the detection of the end timing of the carrier recovery section after its D.C. component has grown sufficiently large. After that the control circuit 15, by detecting the down edge of the carrier recovery section detection signal, outputs the aforementioned carrier recovery section completion detection signal. The reason for this pretreatment before the detection of the down edge of the carrier recovery section detection signal is as follows.

For instance, the output of the D.C. component extracting means 19 may rise impulsively to a high level outside the carrier recovery section as represented by X in FIG. 7(a). Such an impulse may occur outside the carrier recovery section of the received burst when a DC level generated by the succession of several bits having a high level information bit in the data section fails to be fully eliminated by the D.C. component extracting means 19. If the control circuit 15 is structured in this way, even if the carrier recovery section detection signal temporarily rises to a high level as represented by X in FIG. 7(a), the count of the counter 32 will not surpass its prescribed value, and the switching circuit 31 will not be switched. Therefore, the fall of this impulse will not be mistaken for the completion of the carrier recovery section.

Incidentally, in the D.C. component extracting means 19 of this first preferred embodiment, if the D.C. component from the demodulator 10 is sufficiently smoothed by, for instance, sufficiently narrowing the pass bands of the first and second low-pass filters 11 and 13 so that no such impulse may leak into the carrier recovery section detection signal, or if the D.C. component extracting means 19 is provided with a function to remove such impulses, this control circuit 15 may as well be composed of the down edge detecting circuit 34 alone.

Next will be described a second preferred embodiment of the present invention. In the first embodiment, the start timing and the end timing of the carrier recovery section are detected by using only one threshold (TH). In this second embodiment two thresholds TH1 and TH2 are used. In further detail, the threshold TH1 is used for detecting the arrival of the carrier recovery section, and TH2, for detecting the end timing of the carrier recovery section. The advantage of the use of these two thresholds will be explained later.

FIG. 8 is a block diagram illustrating the second preferred embodiment of the invention. What is illustrated in FIG. 8 differs from that in FIG. 5 only in the parts pertaining to a comparator circuit 14, a control circuit 15 and a selector 20. The following description will limit itself to these parts.

Referring to FIG. 8, the D.C. component of the output of a demodulator 10, supplied from D.C. component extracting means 19, is provided to one of the input terminals of the comparator circuit 14. The selector 20 provides one of the two thresholds TH1 and TH2 to the other input terminal of the comparator circuit 14 according to the switching control signal supplied from the control circuit 15. This switching control signal was already explained with reference to FIG. 6. The selector 20 supplies the greater threshold (TH1) during the period of detecting the carrier recovery section input, i.e. when the switching control signal is at its low level, or supplies the smaller threshold (TH2) during the period of detecting the end timing of the carrier recovery section, i.e. when the switching control signal is at its high level. The comparator circuit 14, on the basis of the threshold selected in this manner, supplies the control circuit 15 with a signal indicating whether the output of the D.C. component extracting means 19 is above the provided threshold, i.e. the carrier recovery section detection signal. The configuration and operation of the control circuit 15 are the same as those of the control circuit 15 described with reference to FIG. 6 except that the switching control signal is supplied to the selector 20. The control circuit 15 generates the carrier recovery section completion detection signal, and supplies it to an aperture generating circuit 16. The operations of the aperture generating circuit 16 and a unique word detector 17 are the same as those in the first embodiment and the prior art described with reference to FIG. 2, a unique word detection signal being supplied to a terminal 3.

It may be relevant here to describe the advantage of the second preferred embodiment over the first. In the first embodiment, a single threshold (TH) is used to detect the start timing and the end timing of the carrier recovery section. A problem here is to determine how high the TH should be set. If it is set lower than a certain level, there will be a higher probability of misperceiving the arrival of the carrier recovery section, on account of noise or the like, in another part than the carrier recovery section. In other words, the start timing of the carrier recovery section may be misdetected. This misdetection is more likely to occur where the C/N ratio of the received burst is low.

If, on the other hand, TH is set above a certain level, there will be no misdetection of the start timing of the carrier recovery section. Where the C/N ratio of the received burst is low, however, the output of the D.C. component extracting means 19 in the carrier recovery section is more likely to fluctuate. Accordingly, there will be a possibility of mistaking a fluctuation in the output of the D.C. component extracting means 19 for the completion of the carrier recovery section.

The second preferred embodiment is free from this problem because the start timing of the carrier recovery section is determined with the higher threshold and the end timing of the carrier recovery section, with the lower threshold.

As described, in detecting a unique word according to the present invention, after the burst reception is determined by detecting the start timing of the carrier recovery section, the end timing of the carrier recovery section, whose detection timing is little dispersed even at a low C/N ratio, is detected. By estimating the timing at which the unique word will be detected with reference to the detected timing, the position in which the unique word is to be detected is predicted, and the unique word can be detected at a high probability (without overlooking or misdetecting it). The present invention will prove particularly useful in burst transmission systems, such as the voice activation system, where the arrival of a burst is totally unpredictable and the establishment of initial phase acquisition tends to be delayed.

What is claimed is:

1. A unique word detection apparatus for detecting a unique word out of a demodulated signal resulting from the demodulation by a demodulator, of a burst signal consisting of a carrier recovery section, a bit timing recovery section, a unique word section and a data section, comprising:

D.C. component extracting means for extracting the D.C. component of said demodulated signal;

first detecting means for detecting a transition timing to said bit timing recovery section from the output of said D.C. component extracting means and for generating a timing signal;

means for generating an aperture signal with which to estimate the position of the unique word contained in said demodulated signal on the basis of said timing signal; and second detecting means for detecting the unique word out of said demodulated signal on the basis of said aperture signal.

2. A unique word detection apparatus, as claimed in claim 1, wherein said first detecting means comprises:

comparator means for comparing said D.C. component with a threshold, and outputting an ON signal when said DC component exceeds the threshold and outputting an OFF signal when said D.C. component does not exceed the threshold;

third detecting means for detecting when said comparator means outputs said ON signal which indicates said DC component exceeds the threshold for a certain duration; and level transition detecting means for detecting, after the continuation of said ON signal for a certain duration, the transition of the output of said comparator means from said ON signal to said OFF signal and supplying said timing signal.

3. A unique word detection apparatus, as claimed in claim 2, wherein said first detecting means is further provided with threshold output means for supplying a first threshold when the output of said comparator means is said ON signal and a second threshold when it is said OFF signal.

4. A unique word detection apparatus, as claimed in claim 1, wherein said first detecting means comprises comparator means for comparing said D.C. component with the threshold, outputting an ON signal when said D.C. component exceeds a threshold, and outputting an OFF signal when not, and means for detecting a transition point from said ON signal to said OFF signal and outputting timing signal.

* * * * *